(12) United States Patent
Li et al.

(10) Patent No.: US 11,872,795 B2
(45) Date of Patent: Jan. 16, 2024

(54) UNIT PLATE POSITION FIXATION METHOD AND DEVICE AND LAMINATION MACHINE

(71) Applicant: SHENZHEN GEESUN INTELLIGENT TECHNOLOGY CO., LTD., Guangdong (CN)

(72) Inventors: Panpan Li, Guangdong (CN); Ke Xie, Guangdong (CN); Xin Fu, Guangdong (CN); Xueke Wu, Guangdong (CN); Rukun Yang, Guangdong (CN)

(73) Assignee: SHENZHEN GEESUN INTELLIGENT TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/740,602

(22) Filed: May 10, 2022

(65) Prior Publication Data
US 2022/0371316 A1    Nov. 24, 2022

(30) Foreign Application Priority Data

May 24, 2021    (CN) .......................... 202110568143.2

(51) Int. Cl.
*B32B 41/00*    (2006.01)
*G06T 7/00*    (2017.01)

(52) U.S. Cl.
CPC .............. *B32B 41/00* (2013.01); *G06T 7/001* (2013.01); *B32B 2041/04* (2013.01);
(Continued)

(58) Field of Classification Search
CPC . B32B 41/00; B32B 2041/04; B32B 2309/72; B32B 2457/00; B32B 38/1841; G06T 7/001; G06T 2207/10004; G06T 2207/30164; Y02E 60/10; H01M 6/005; H01M 10/0404; H01M 10/0413; H01M 10/0436; Y02P 70/50
(Continued)

(56) References Cited

U.S. PATENT DOCUMENTS

| 10,985,408 | B2 | 4/2021 | Fujiwake et al. |
| 2019/0252730 | A1* | 8/2019 | Fujiwake ............. H01M 4/043 |
| 2020/0067051 | A1* | 2/2020 | Yamashita ............ H01M 50/46 |

FOREIGN PATENT DOCUMENTS

| CN | 101783420 A | 7/2010 |
| CN | 102672948 A | 9/2012 |

(Continued)

OTHER PUBLICATIONS

First Search Report on the Chinese Patent Application No. 2021105681432.
(Continued)

*Primary Examiner* — Michael N Orlando
*Assistant Examiner* — Joshel Rivera
(74) *Attorney, Agent, or Firm* — IP & T GROUP LLP

(57) ABSTRACT

A unit plate position fixation method and device and a lamination machine are provided. The unit plate position fixation method includes: obtaining peripheral position information of unit plates located between two layers of separators; controlling a hot-pressing device according to the peripheral position information to perform hot pressing on the two layers of separators, so that the two layers of separators are adhered at peripheral positions of the unit plates.

5 Claims, 3 Drawing Sheets

(52) U.S. Cl.
CPC ....... *B32B 2309/72* (2013.01); *B32B 2457/00* (2013.01); *G06T 2207/10004* (2013.01); *G06T 2207/30164* (2013.01)

(58) Field of Classification Search
USPC .................. 156/60, 64, 350, 351, 378, 379
See application file for complete search history.

(56) References Cited

FOREIGN PATENT DOCUMENTS

| CN | 105336976 | A | 2/2016 |
|----|-----------|---|--------|
| CN | 105703016 | A | 6/2016 |
| CN | 106252732 | A | 12/2016 |
| CN | 108023118 | A | 5/2018 |
| CN | 109365307 | A | 2/2019 |
| CN | 110588068 | A | 12/2019 |
| CN | 110994039 | A | 4/2020 |
| CN | 210403945 | U | 4/2020 |
| CN | 211829068 | U | 10/2020 |
| CN | 212412108 | U | 1/2021 |
| JP | 2009009919 | A | 1/2009 |
| JP | 2017117591 | A | 6/2017 |
| WO | 2018116542 | A1 | 6/2018 |
| WO | 2018116543 | A1 | 6/2018 |

OTHER PUBLICATIONS

First Office Action on the Chinese Patent Application No. 202110568143.2 issued by the Chinese Patent Office.
Second Office Action on the Chinese Patent Application No. 202110568143.2 issued by the Chinese Patent Office.
First Office Action on the Japanese Patent Application No. 2022-078667 issued by the Japanese Patent Office.
First Office Action on the European Patent Application No. 22172410.7 issued by the European Patent Office dated Nov. 3, 2022.
Extended European Search Report on the European Patent Application No. 22172410.7 issued by the European Patent Office dated Oct. 21, 2022.

* cited by examiner

UNIT PLATE POSITION FIXATION METHOD AND DEVICE AND LAMINATION MACHINE

CROSS-REFERENCE TO RELATED APPLICATION

The present disclosure claims priority to Chinese patent application with the filing number 202110568143.2 filed on May 24, 2021 with the Chinese Patent Office, and entitled "Unit Plate Position fixation Method and Device and Lamination Machine", the contents of which are incorporated herein by reference in entirety.

TECHNICAL FIELD

The present disclosure relates to the technical field of jellyroll preparation, in particular to a unit plate position fixation method, device and lamination machine (stacking machine).

BACKGROUND ART

A laminated jellyroll, which consists of an anode piece, a cathode piece and two-separator pieces, is produced by folding method under pressure and thermal atmosphere.

In the folding process of the compound lamination, in the case of poor thermal compounding, the unit plates may shift relative to the separators. It is difficult to detect the occurrence of the shift of the unit plates arranged between the two layers of separators, resulting in that it is hard to make timely adjustment, thus affecting the lamination precision and consequently leading to unqualified prepared laminated jellyrolls.

SUMMARY

The objective of the present disclosure is to provide a unit plate position fixation method, which can prevent the unit plates arranged between two layers of separators from shifting during lamination process, ensuring the lamination precision and increasing the yield rate of the jellyroll.

Another objective of the present disclosure is to provide a unit plate position fixation device capable of preventing the unit plates arranged between two layers of separators from shifting during lamination process, ensuring the lamination precision and increasing the yield rate of the jellyroll.

The present disclosure provides a technical solution.

A method for unit plate position fixation, includes steps of:
  obtaining peripheral position information of unit plates located between two layers of separators;
  controlling a hot-pressing device to perform hot pressing on the two layers of separators according to the peripheral position information, so that the two layers of separators are adhered at peripheral positions of the unit plates.

In optional embodiments, the step of obtaining peripheral position information of the unit plates between the two layers of separators includes steps of:
  obtaining position information of the unit plates during their movement with the two layers of separators;
  controlling a detection device according to the position information of the unit plates, to detect the unit plates, and receiving a detection signal sent from the detection device;
  processing the detection signal to obtain the peripheral position information.

In optional embodiments, the detection device is a CCD camera, the step of controlling a detection device according to the position information of the unit plates to detect the unit plates and receiving a detection signal sent from the detection device includes:
  comparing the position information with predetermined reference information;
  controlling, if a first comparison result is obtained, the CCD camera to photograph the compound lamination consisting of the unit plates and the two layers of separators; and
  receiving an image signal from the CCD camera.

In optional embodiments, the step of controlling a hot-pressing device to perform hot pressing on the two layers of separators according to the peripheral position information so that the two layers of separators are adhered at peripheral positions of the unit plates includes:
  controlling the hot-pressing device according to the peripheral position information to sequentially hot press, for predetermined time, portions of the two layers of separators corresponding to a plurality of edges of the unit plates.

In optional embodiments, the steps of controlling a hot-pressing device to perform hot pressing on the two layers of separators according to the peripheral position information so that the two layers of separators are adhered at the peripheral positions of the unit plates includes:
  controlling the hot-pressing device according to the peripheral position information to simultaneously hot press, for predetermined time, portions of the two layers of separators corresponding to a plurality of edges of the unit plates.

The present disclosure provides further a unit plate position fixation device, including:
  an obtaining module, used to obtain peripheral position information of unit plates located between two layers of separators; and
  a controlling module, used to control a hot-pressing device according to the peripheral position information to perform hot pressing on the two layers of separators, so that the two layers of separators are adhered at peripheral positions of the unit plates.

In optional embodiments, the obtaining module includes:
  an obtaining sub-module, used to obtain position information of the unit plates during their movement with the two layers of separators;
  a controlling sub-module, used to control the detection device according to the position information to detect the unit plates, and to receive the detection signal from the detection device; and
  a processing sub-module, used to process the detection signal for obtaining the peripheral position information.

In optional embodiments, the detection device is a CCD camera and the controlling sub-module includes:
  a comparing sub-module, used to compare the position information with predetermined reference information;
  a photographing control sub-module, used to control, in the case of obtaining a first comparison result, the CCD camera to photograph the compound lamination consisting of the unit plates and the two layers of separators; and
  a receiving sub-module, used to receive the image signal sent from the CCD camera.

The present disclosure further provides a lamination machine, including a body, a controller, a detection device and a hot-pressing device, wherein the detection device and the hot-pressing device are both arranged on the body; the controller is electrically connected to the detection device and the hot-pressing device, respectively; the detection device is used to detect peripheral positions of unit plates located between two layers of separators; the controller is used to obtain the peripheral position information according to the detection result of the detection device and to control the hot-pressing device according to the peripheral position information to perform hot pressing on the two layers of separators, so that the two layers of separators are adhered at the peripheral positions of the unit plates.

In optional embodiments, the lamination machine further includes a position sensor, arranged on the body and used to detect the positions of the unit plates during their movement with the two layers of separators, and the controller is further used to obtain the position information according to the detection result of the position sensor, and to control the detection device according to the position information to detect the unit plates, so as to obtain the peripheral position information.

Compared with the prior art, the unit plate position fixation method provided by the present disclosure controls the hot-pressing device to perform hot pressing on the two layers of separators, by obtaining the peripheral position information of the unit plates located between the two layers of separators, so that the two layers of separators are adhered at the peripheral positions of the unit plates, forming a space closed along the peripheries of the unit plates to achieve the fixation of the unit plates located between the two layers of separators, thereby avoiding the unit plates from shifting relative to the separators. Therefore, the advantageous effects of the unit plate position fixation method provided by the present disclosure includes: being able to prevent the unit plates arranged between the two layers of separators from shifting during lamination process, ensuring the lamination precision and increasing the yield rate of the jelly-rolls.

BRIEF DESCRIPTION OF DRAWINGS

In order to illustrate the technical solution of the embodiments in the present disclosure, the drawings which are necessary to be used in embodiments shall be briefly introduced below. It should be appreciated that the following drawings only show some certain embodiments of this application and thus should not be regarded as limiting in scope. For a skilled person in the art, other related drawings can be obtained from these drawings without inventive effort.

Figure 1:
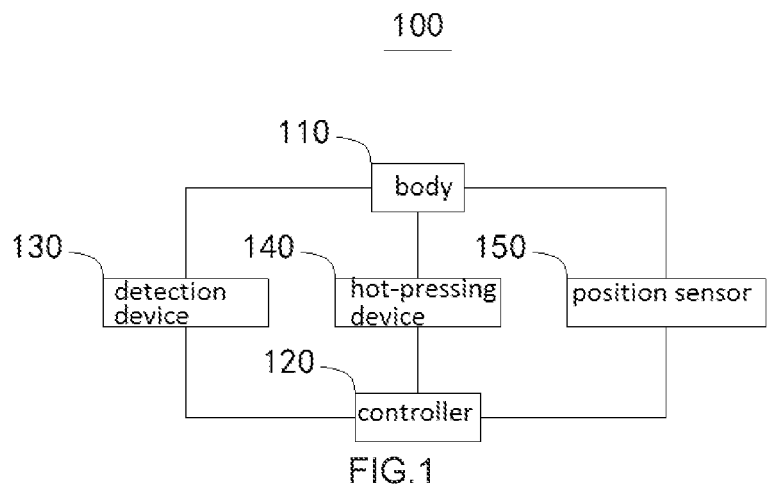
FIG. 1 is a structural block diagram of a lamination machine provided by by first embodiment of the disclosure.

Reference signs: 100—lamination machine; 110—body; 120—controller; 130—detection device; 140—hot-pressing device; 150—position sensor; 200—unit plate position fixation device; 210—obtaining module; 211—obtaining sub-module; 212—controlling sub-module; 212a—comparing sub-module; 212b—photographing control sub-module; 212c—receiving sub-module; 213—processing sub-module; 220—controlling module.

DETAILED DESCRIPTION OF EMBODIMENTS

In order to further clarify the objectives, the technical solutions and the advantages of embodiments of the present disclosure, technical solutions in embodiments of the present disclosure will be described clearly and completely below in combination with the drawings in the embodiments of this disclosure. Obviously, the described embodiments are some embodiments of the present disclosure, and not all of them. The components of the embodiments of the present disclosure generally described and illustrated in the accompanying drawings herein may be arranged and designed in a variety of different configurations.

Therefore, the following detailed description of embodiments of the present disclosure provided in the drawings is not intended to limit the scope of the claimed disclosure but merely indicates selected embodiments of the present disclosure. Based on the embodiments in the present disclosure, all other embodiments obtained by a skilled person in the art without creative labor fall within the scope of the present disclosure.

It should be noted that similar reference signs and letters indicate similar items in the accompanying drawings below, so that once an item is defined in a drawing, it does not require further definition and explanation in subsequent drawings.

It should be understood that in the description of the present disclosure, orientation or positional relationship indicated by terms such as "upper", "lower", "inside", "outside", "left", "right", are based on the orientation or positional relationship shown in the drawings, or the orientation or positional relationship in which the product of the disclosure is customarily placed in use, or the orientation or positional relationship as customarily understood by those skilled in the art, are intended only to facilitate and simplify the description of the present disclosure, instead to indicate or imply that the device or element referred to must have a particular orientation, be constructed and operated in a particular orientation, and therefore are not to be construed as limit to the present disclosure.

Moreover, terms such as "first", "second", etc. are merely used for description and cannot be construed as an indication or implication of importance in relativity.

In the description of the present disclosure, it should also be noted that, unless otherwise expressly specified and limited, terms such as "provide" and "connect" should be understood in a broad sense, for example, "connect" can be a fixed connection, a detachable connection, or an integral connection; can be a mechanical connection or an electrical connection; can be a direct connection or an indirect connection through an intermediate medium, or internal communication between two components. For those skilled in the art, the specific meaning of the above terms in the present disclosure can be understood according to the specific circumstances.

Embodiments of the present disclosure are described in detail below combination with the drawings.

In the present application, the unit plate refers to an electrode, a plate, a piece, a cathode, or an anode.

First Embodiment

Referring to FIG. 1, FIG. 1 shows a structural block diagram of a lamination machine 100 provided by the present embodiment. The lamination machine 100 includes a body 100, a controller 120, a detection device 130, a hot-pressing device 140 and a position sensor 150, wherein the controller 120, the detection device 130, the hot-pressing device 140 and the position sensor 150 are all arranged on the body 110; the controller 120 is electrically connected to the detection device 130, the hot-pressing device 140 and the position sensor 150, respectively.

The position sensor 150 is used to detect the positions of the unit plates during their movement with the two layers of separators and to send the detection results to the controller 120, the controller 120 is used to obtain the position information of the unit plates according to the detection results of the position sensor 150, and to control the detection device 130 according to the position information to detect the unit plates, and to obtain the peripheral position information of the unit plates according to the detection results of the detection device 130.

In the present embodiment, the detection device 130 is a CCD camera, wherein the controller 120 controls, after obtaining the position information of the unit plates, the CCD camera to photograph the compound lamination consisting of the unit plates and the two layers of separators, and receives the image signal sent from the CCD camera. In other embodiments, other devices such as a sensor may also be used as the detection device 130.

After the controller 120 obtains the peripheral position information of the unit plates, the controller 120 is also used to control according to the peripheral position information the hot-pressing device 140 to perform hot pressing on the two layers of separators, so that the two layers of separators are adhered at the peripheral positions of the unit plates, forming a closed holding room, which holds the unit plates inside.

In the present embodiment, the shape of the hot-pressing end of the hot-pressing device 140 is identical to the shape of the peripheries of the unit plates. After obtaining the peripheral position information of the unit plates, the controller 120 controls the hot-pressing device 140 to perform hot pressing on portions of the two layers of separators corresponding to the peripheries of the unit plates fora predetermined time. In other embodiments, other hot-pressing device 140 with straight hot-pressing end may also be used, and the controller 120 controls such hot-pressing device 140 to sequentially hot press a plurality of edges of the separators corresponding to the peripheries of the unit plates for predetermined time.

The lamination machine 100 provided by the present embodiment achieves position fixation of the unit plates and prevents the unit plates arranged between the two layers of separators from shifting during lamination process, by obtaining the peripheral position information of the unit plates located between the two layers of separators and controlling the hot-pressing device 140 to perform the hot pressing on the portions of the two layers of separators corresponding to the peripheries of the unit plates, to make them adhered, ensuring the lamination precision and increasing the yield rate of the jellyrolls.

Second Embodiment

Figure 2:
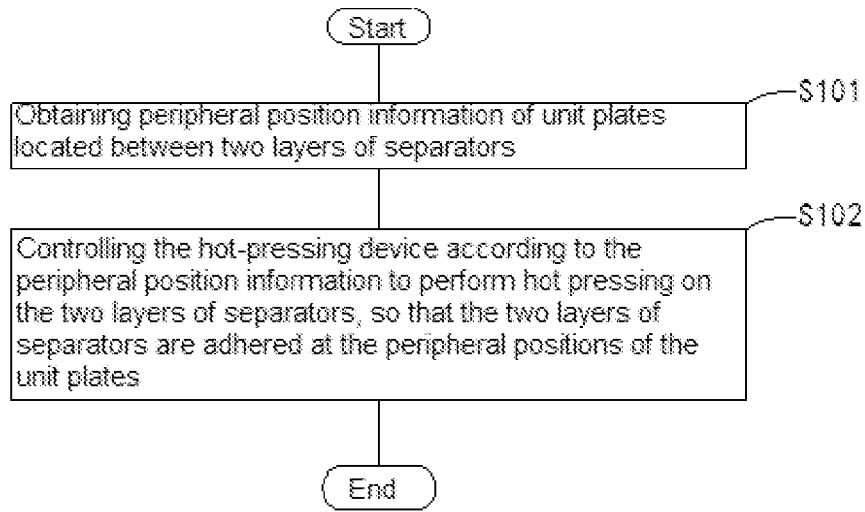
FIG. 2 is a flow block diagram of a unit plate position fixation method provided by the second embodiment of the disclosure.

Referring to FIG. 2, FIG. 2 shows a flow block diagram of the unit plate position fixation method provided by the present embodiment, which is applied to the lamination machine 100 provided by First embodiment.

The unit plate position fixation method provided by the present embodiment includes:

Step S101, obtaining peripheral position information of unit plates located between two layers of separators.

Figure 3:
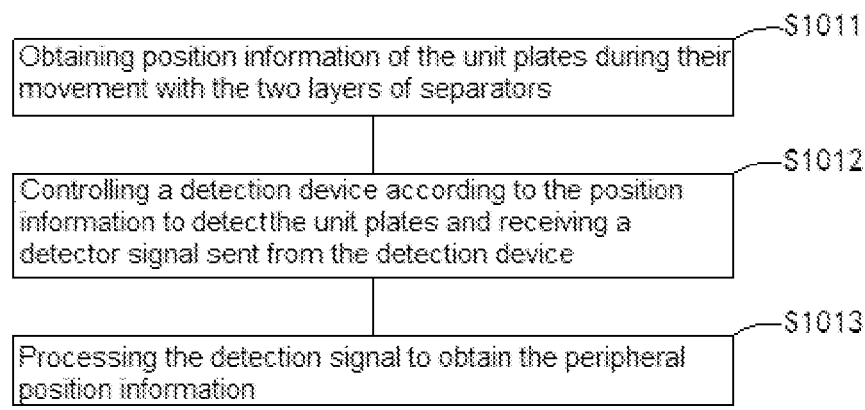
FIG. 3 is a flow block diagram of the sub-steps of step S101 in FIG. 2.

Referring to FIG. 3, FIG. 3 shows a flow block diagram of the sub-steps of the step S101. The step S101 may include:

Sub-step S1011, obtaining the position information of the unit plates during their movement with the two layers of separators.

In the present embodiment, a position sensor 150 is arranged on the transport path of the separators, a controller 120 is electrically connected to the position sensor 150, receives the detection results of the position sensor 150 continuously and obtains position information of the unit plates according to the detection result of the position sensor 150.

Sub-step S1012, controlling a detection device 130 according to the position information to detect the unit plates and receiving the detection signal sent from the detection device 130.

Figures 4, 5, 6:
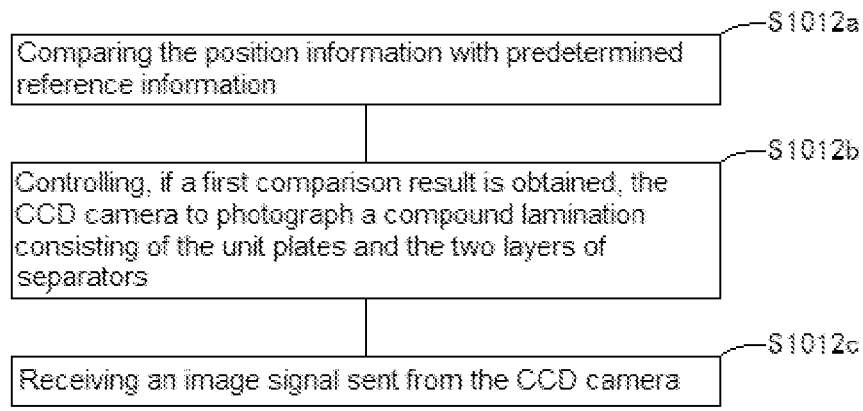
FIG. 4 is a flow block diagram of h sub-steps of sub-step S1012 in FIG. 3.
FIG. 5 is a structural block diagram of the unit plate position fixation device provided by the third embodiment of the disclosure.
FIG. 6 is a structural block diagram of the obtaining module in FIG. 5.

Referring to FIG. 4, FIG. 4 shows a flow block diagram of the sub-steps of the sub-step S1012. In the present embodiment, the detection device 130 is a CCD camera and the sub-step S1012 includes:

Sub-step S1012a, comparing the position information with predetermined reference information.

In the separator transport process, when the unit plates pass the detection point of the position sensor 150, the position information obtained by the controller 120 is compared with the predetermined reference information to obtain the first comparison result; when the gap between the two unit plates passes the detection point of the position sensor 150, the position information obtained by the controller 120 is compared with the predetermined reference information to obtain the second comparison result.

Sub-step S1012b, if the first comparison result is obtained, the CCD camera is controlled to photograph the compound lamination consisting of the unit plates and the two layers of separators.

By presetting the position of the CCD camera, when the first comparison result is obtained, the characterizing unit plate just reaches the photographing area of the CCD camera. At this time, the controller 120 controls the CCD camera to perform photographing.

Sub-step S1012c, receiving the image signal sent from the CCD camera.

The CCD camera obtains the image signal after photographing and transmits the image signal to the controller 120.

Continuing to refer to FIG. 3, the step S101 may also include:

Sub-step S1013, processing the detection signal to obtain the peripheral position information.

After the controller 120 receives the image signal, the image signal is analyzed and processed to obtain the peripheral position information of the corresponding unit plate.

Continuing to refer to FIG. 2, the unit plate position fixation method may further include:

Step S102, controlling the hot-pressing device 140 according to the peripheral position information to perform hot pressing on the two layers of separators, so that the two layers of separators are adhered at the peripheral positions of the unit plates.

In the present embodiment, the shape of the hot-pressing end of the hot-pressing device 140 is identical to the shapes of the peripheries of the unit plates. After obtaining the peripheral position information of the unit plates, the controller 120 controls the hot-pressing device 140 to perform hot pressing on portions of the two layers of separators corresponding to the peripheries of the unit plates for predetermined time.

In other embodiments, other hot-pressing device 140 with straight hot-pressing end may also be used, and the controller 120 controls such hot-pressing device 140 to sequentially hot press a plurality of edges on the two layers of separators corresponding to the peripheries of the unit plates for predetermined period, to achieve the same effect.

In summary, the unit plate position fixation method provided by the present embodiment achieves the position fixation of the unit plates and prevents the unit plates arranged between the two layers of separators from shifting during lamination process, by obtaining the peripheral position information of the unit plates located between the two layers of separators and controlling the hot-pressing device 140 to perform hot pressing on the portions of the two layers of separators corresponding to the peripheries of the unit plates, ensuring the lamination precision and increasing the yield rate of the jellyrolls.

Third Embodiment

For a better implementation of the unit plate position fixation method provided by the second embodiment, a unit plate position fixation device 200 is provided by the present embodiment. Referring to FIG. 5, FIG. 5 shows a connection block diagram of the unit plate position fixation device 200 provided by the present embodiment, the unit plate position fixation device 200 provided by the present embodiment includes an obtaining module 210 and a controlling module 220.

The obtaining module 210 is used to obtain peripheral position information of unit plates located between two layers of separators, and the obtaining module 210 is used to implement the step S101 of the unit plate position fixation method provided by Second embodiment.

The controlling module 220 is used to control according to the peripheral position information a hot-pressing device 140 to perform hot pressing on the two layers of separators, so that the two layers of separators are adhered at the peripheral positions of the unit plates, and the controlling module 220 is used to implement the step S102 of the unit plate position fixation method provided by Second embodiment.

Referring to FIG. 6, FIG. 6 shows a structural block diagram of the obtaining module 210, the obtaining module includes:

an obtaining sub-module 211, used to obtain the position information of the unit plates during their movement with the two layers of separators, wherein the obtaining sub-module 211 is used to implement the sub-step S1011 of the unit plate position fixation method provided by Second embodiment;

a controlling sub-module 212, used to control the detection device 130 according to the position information to detect the unit plates and to receive the detection signal sent from the detection device 130, wherein the controlling sub-module 212 is used to implement the sub-step S1012 of the unit plate position fixation method provided by Second embodiment; and a processing sub-module 213, used to process the detection signal to obtain the peripheral position information, wherein the processing sub-module 213 is used to implement the sub-step S1013 of the unit plate position fixation method provided by Second embodiment.

Figure 7:
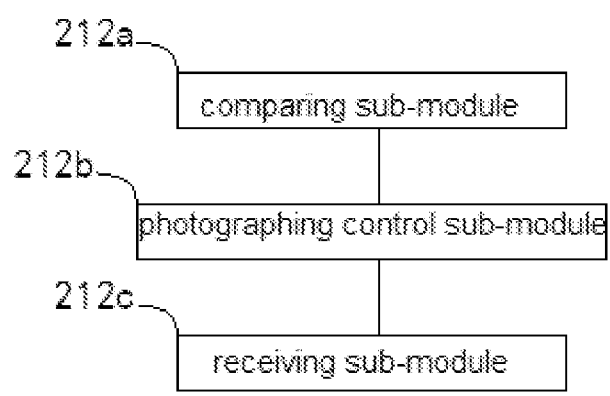
FIG. 7 is a structural block diagram of the controlling sub-module in FIG. 6.

Referring to FIG. 7, FIG. 7 shows a structural block diagram of the controlling sub-module 212. In the present embodiment, the detection device 130 is a COD camera and the controlling sub-module 212 includes:

a comparing sub-module 212*a*, used to compare the position information with predetermined reference information, wherein the comparing sub-module 212*a* is used to implement the sub-step S1012*a* of the unit plate position fixation method provided by Second embodiment;

a photographing control sub-module 212*b*, used to control, in the case of obtaining the first comparison result, the COD camera to photograph the compound lamination consisting of the unit plates and the two layers of separators, wherein the photographing control sub-module 212*b* is used to implement the sub-step S1012*b* of the unit plate position fixation method provided by Second embodiment; and a receiving sub-module 212*c*, used to receive the image signal sent from the COD camera, wherein the receiving sub-module 212*c* is used to implement the sub-step S1012*c* of the unit plate position fixation method provided by Second embodiment.

Therefore, the unit plate position fixation device 200 provided by the present embodiment can implement the unit plate position fixation method provided by Second embodiment, to achieve position fixation of the unit plates and prevent the unit plates arranged between the two layers of separators from shifting during lamination process, which ensures the lamination precision and increases the yield rate of the jellyrolls.

The above are merely preferred embodiments of the present disclosure and not intended to limit the present disclosure. For those skilled in the art, the present disclosure may have various changes and variations. Any modifications, equivalent replacements, improvements, etc. made within the spirits and principles of the present disclosure shall be included in the scope of protection of the present disclosure.

What is claimed is:

1. A unit plate position fixation method, comprising steps of:

obtaining peripheral position information of unit plates located between two layers of separators; and controlling a hot-pressing device according to the peripheral position information to perform hot pressing on the two layers of separators, so that the two layers of separators are adhered at peripheral positions of the unit plates, wherein the step of obtaining peripheral position information of unit plates located between two layers of separators comprises steps of:

obtaining position information of the unit plates during their movement with the two layers of separators;

controlling a detection device according to the position information to detect the unit plates, and receiving a detection signal sent from the detection device; and processing the detection signal to obtain the peripheral position information, wherein the detection device is a CCD camera, and the step of controlling a detection device according to the position information to detect the unit plates and receiving a detection signal from the detection device comprises:
  comparing the position information with predetermined reference information;
  controlling, if a first comparison result is obtained, the CCD camera to photograph a compound lamination comprising the unit plates and the two layers of separators; and
  receiving an image signal sent from the CCD camera.

2. The unit plate position fixation method according to claim 1, wherein the step of controlling a hot-pressing device to perform hot pressing on the two layers of separators so that the two layers of separators are adhered at peripheral positions of the unit plates comprises:
  controlling the hot-pressing device according to the peripheral position information to sequentially hot press, for predetermined time, portions of the two layers of separators corresponding to a plurality of edges of the unit plates.

3. The unit plate position fixation method according to claim 1, wherein the step of controlling a hot-pressing device to perform hot pressing on the two layers of separators so that the two layers of separators are adhered at the peripheral positions of the unit plates comprises:
  controlling the hot-pressing device according to the peripheral position information to simultaneously hot press, for predetermined time, portions of the two layers of separators corresponding to a plurality of edges of the unit plates.

4. A unit plate position fixation device, comprising:
  an obtaining module, configured to obtain peripheral position information of unit plates located between two layers of separators; and
  a controlling module, configured to control a hot-pressing device according to the peripheral position information to perform hot pressing on the two layers of separators, so that the two layers of separators are adhered at peripheral positions of the unit plates,
  wherein the obtaining module comprises:
  an obtaining sub-module, configured to obtain position information of the unit plates during their movement with the two layers of separators;
  a controlling sub-module, configured to control a detection device according to the position information to detect the unit plates, and to receive a detection signal sent from the detection device; and
  a processing sub-module, configured to process the detection signal to obtain the peripheral position information,
  wherein the detection device is a CCD camera, and the controlling sub-module comprises:
  a comparing sub-module, configured to compare the position information with predetermined reference information;
  a photographing control sub-module, configured to control, in the case of obtaining a first comparison result, the CCD camera to photograph a compound lamination comprising the unit plates and the two layers of separators; and
  a receiving sub-module, configured to receive an image signal sent from the CCD camera.

5. A lamination machine, comprising a body, a controller, a detection device and a hot-pressing device, wherein the detection device and the hot-pressing device are both arranged on the body; the controller is electrically connected to the detection device and the hot-pressing device, respectively; the detection device is configured to detect peripheral positions of the unit plates located between two layers of separators; the controller is configured to obtain peripheral position information according to detection results of the detection device and to control the hot-pressing device according to the peripheral position information to perform hot pressing on the two layers of separators, so that the two layers of separators are adhered at the peripheral positions of the unit plates,
  wherein the lamination machine further comprises a position sensor, the position sensor is arranged on the body and configured to detect positions of the unit plates during their movement with the two layers of separators, and the controller is further configured to obtain position information according to detection results of the position sensor, and to control the detection device according to the position information to detect the unit plates, so as to obtain the peripheral position information,
  wherein the detection device comprises a CCD camera, and
  wherein the controller is configured to compare the position information with predetermined reference information, control, if a first comparison result is obtained, the CCD camera to photograph a compound lamination comprising the unit plates and the two layers of separators, and receive an image signal sent from the CCD camera.

* * * * *